United States Patent [19]

King et al.

[11] Patent Number: 4,660,143

[45] Date of Patent: Apr. 21, 1987

[54] PROGRAMMABLE REALTIME INTERFACE BETWEEN A BLOCK FLOATING POINT PROCESSOR AND MEMORY

[75] Inventors: Thomas M. King, Mesa; Sam M. Daniel, Tempe, both of Ariz.

[73] Assignee: The United States of America as represented by the Secretary of the Air Force, Washington, D.C.

[21] Appl. No.: 653,641

[22] Filed: Sep. 24, 1984

[51] Int. Cl.[4] ............................................. G06F 13/12
[52] U.S. Cl. ..................................... 364/200; 364/748
[58] Field of Search ................. 364/748, 200 MS File, 364/900 MS File

[56] References Cited

U.S. PATENT DOCUMENTS

| | | | |
|---|---|---|---|
| 4,000,487 | 12/1976 | Patterson et al. | 340/172.5 |
| 4,006,466 | 2/1977 | Patterson et al. | 340/172.5 |
| 4,080,649 | 3/1978 | Calle et al. | 364/200 |
| 4,149,238 | 4/1979 | James et al. | 364/200 |
| 4,161,784 | 7/1979 | Cushing et al. | 364/748 |
| 4,217,640 | 8/1980 | Porter et al. | 364/200 |
| 4,225,922 | 9/1980 | Porter | 364/200 |

*Primary Examiner*—Archie E. Williams
*Assistant Examiner*—Michael J. Ure

*Attorney, Agent, or Firm*—William G. Auton; Donald J. Singer

[57] ABSTRACT

The programmable interface gives a Block Floating Point processor the capability of performing various real-time signal algorithms on collected radar data in an external batch memory. Normally, Block Floating Point processors are not capable of accommodating data having varying exponent scales such as the data received from a batch memory in a radar system. The programmable interface solves the exponential normalization process using two data paths, an instruction processor, a microcode processor, a pre-shift control and an address generator. Data flow instructions are passed from the instruction processor to the microcode processor which executes the particular instruction's timing sequence. The first data path passes data from the batch memory to the array processor and contains a pre-shifter to normalize the batch memory-stored data. The second data path passes the processed data from the processor to the batch memory. The pre-shifter portion of the first data path is controlled by a pre-shifter control section in the invention, which generates a 4-bit code used to command the pre-shifter. Finally, an address generator creates a sequence of fetch and store addresses for data travelling between the batch memory and the array processor.

8 Claims, 2 Drawing Figures

PROGRAMMABLE REALTIME INTERFACE BETWEEN A BLOCK FLOATING POINT PROCESSOR AND MEMORY

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to interfaces between data processors and their memories and more specifically to a programmable interface between a block floating point processor and its memory which allows signal processing to be accomplished in real-time.

Many radar systems routinely follow a heirarchy of real-time decisions in a progression from searching for targets to actual data collection. This hierarchy or chain of decisions is normally accomplished in the following order: search for targets, verification of echo return, target acquisition and tracking, target identification, and data collection.

In order to successfully complete the chain of decisions, radar systems must make decisions by processing data from target echo returns using algorithms in real-time. The processing of data is accomplished by an array processor which has an interface with a batch memory. The batch memory receives radar data from the radar receiver, and the interface transfers data from the batch memory to the array processor where some algorithm is applied to it.

After the array processor applies some decision-making algorithm to the radar data, the interface transfers the result back to the batch memory. The sequence of data transfers is a sequence of FETCH and STORE vector addresses.

However, data that is to be stored back into the batch memory can have varying exponent scales. To use these data for subsequent calculations in the array processor, one of the following conditions must occur: either the array processor must be capable of accommodating data having varying exponent scales, or else some means must be provided to normalize the effective exponents of the new swath over the entire swath.

Block Floating Point processors do not lend themselves to real-time problems since they possess an exponent normalization problem. That is, they are not capable of accommodating data having varying exponent scales. This inherent limitation of Block Floating Point processors suggests that they are not suitable as a general array processor in a radar tracking system since they would be unable to respond to real-time problems without a solution to the exponent normalization problem.

On review of the foregoing discussion, it is apparent that there currently exists the need for providing some means of giving any Block Floating Point processor the capability of performing various real-time signal processing algorithms on collected radar data stored in a radar system's batch memory. The present invention is directed toward satisfying that need.

SUMMARY OF THE INVENTION

The subject invention comprises an interface whose purpose is to give any Block Floating Point processor the capability of perfomring various real-time signals processing algorithms on collected radar data stored in an external batch memory. The invention is a programmable interface with two data paths to transfer data back and forth between the batch memory and the array processor, and contains: a microcode processor, instruction processor, pre-shifter control and address generator to control message traffic and allow a Block Floating Point processor to function in real-time as an array processor.

Radar signals are collected by the radar system's radar receiver and stored as data in the batch memory. The signals are then transferred in real-time over a data path to the array processor for processing. The instruction processor performs a sequence of data fetch and store operations between the batch memory and the array processor.

Data flow instructions are then passed from the instruction processor to the microcode processor which executes the particular instruction's timing sequence.

As mentioned above, the invention contains two data paths. The first data path passes 12-bit batch memory data to the array processor, and the second data path passes the 16-bit output of the array processor back to the batch memory. The first data path (from the batch memory to the array processor) contains a pre-shifter which is used to normalize the batch memory-stored data swath when any portion of the swath is fetched to the array processor. It is this normalization function which allows a Block Floating Point processor to function as an array processor and accomodate data having varying exponent scales. The pre-shifter position of the first data path is controlled by a pre-shifter control section in the invention, which generates a 4-bit code used to command the pre-shifter.

Finally, the invention includes an address generator to create a sequence of fetch and store addresses for data travelling between the batch memory and the array processor.

It is an object of the present invention to provide a new and improved interface between Block Floating Point processors and batch memory units.

It is another object of the present invention to provide an interface that permits Block Floating Point processors to function as an array processor and process radar data in real-time.

It is another object of the present invention to provide an interface capable of normalizing the effective exponents of data from a batch memory while transferring the data to the processor.

These together with other object features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an interface which gives a Block Floating Point processor the capability of performing various real-time signal processing algorithms on collected radar data stored in an external batch memory.

The reason Block Floating Point processors are not generally suitable as array processors is that they do not lend themselves to real-time problems since they possess an exponential normalization problem. That is, Block Floating Point processors are not capable of accommodating data having varying exponent scales such as data received from a batch memory in a radar timing system.

The invention is a programmable interface which solves the exponential normalization problem using: two data paths, a microcode processor, an instruction processor, a pre-shifter control, and an address generator.

Figure 1:
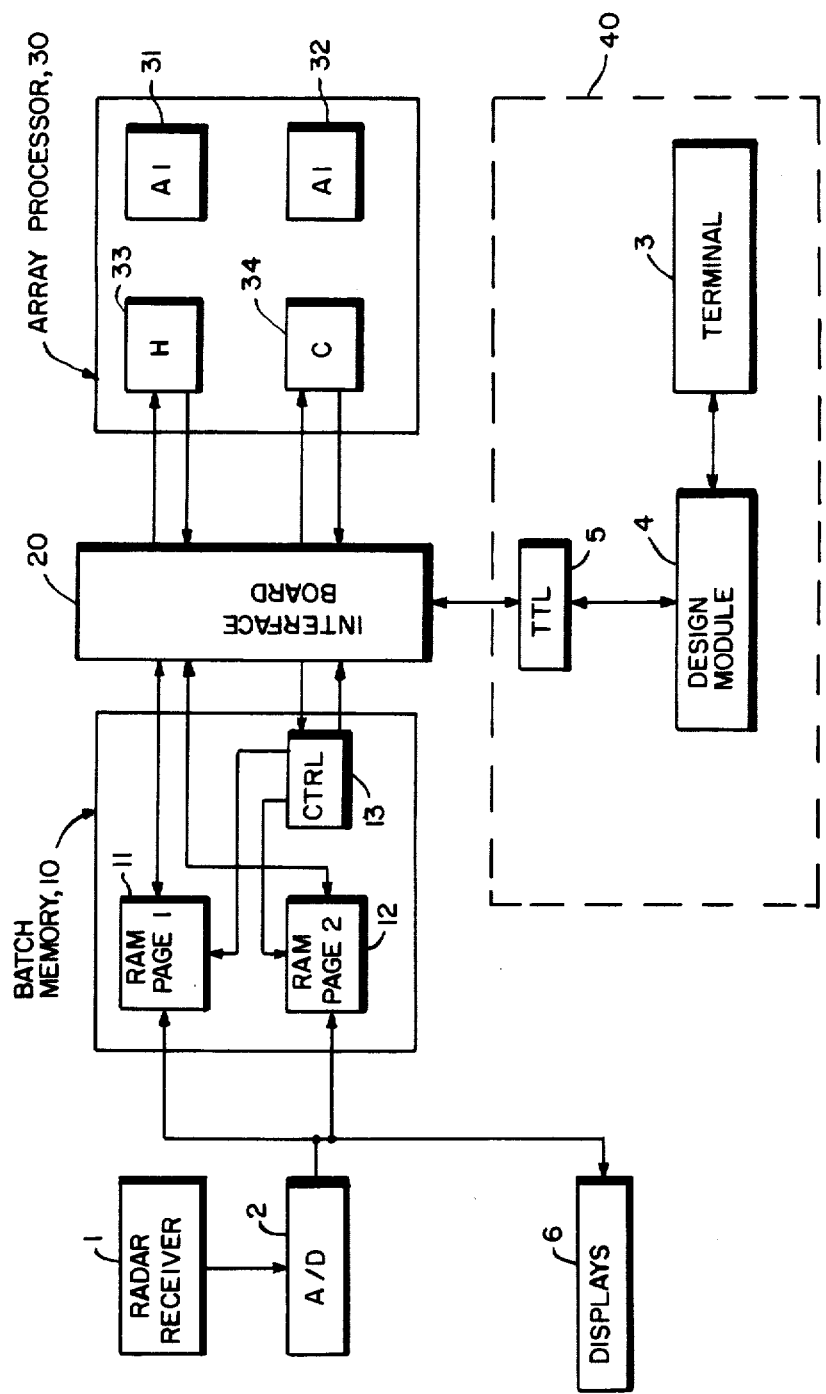
FIG. 1 is a block diagram of a radar system which uses the invention.

FIG. 1 is a block diagram of a radar system which uses the invention 20. From the radar receiver 1 and analog-to-digital (A/D) converter 2 radar data is input into the batch memory 10. The batch memory is a two-page device with a first random access memory (RAM) 11 for page 1; a second random access memory 12 for page 2; and a control and address unit (CTRL) 13. The use of two pages in the batch memory allows one page to collect new data, while the other page is operated on by the interface 20 and array processor 30. True real-time array processing is allowed by alternating between pages the steps of data collection and data processing.

The array processor 30 of FIG. 1 contains: two arithmetic boards 31 and 32, a memory board 33 and a control board 34. As will be shown in a more detailed discussion of the interface, the interface transfers data to the array processor 30, where some algorithm is applied to it, and transfers the result back to the batch memory 10. Since the interface 20 itself is programmable, the array processor 30 need not contain internal memory address related circuits. The programmable interface 20 allows the system user to program a problem using two smaller programs (for the interface and the array processor) instead of one larger program for the array processor only. Finally, the configuration depicted in FIG. 1 reduces the amount of high speed memory needed in the array processor 30 and allows use of the slower, more dense external batch memory 10 while solving the exponent normalization of Block Floating Point processors.

Control over the interface 20 is exercised with the control system 40 consisting of the terminal 3, design module 4, and transistor-transistor logic (TTL) unit 5. The design module 4 is a commercially available module (MC68000) which serves to provide an interface between the terminal 3 and the TTL unit 5. It will be recognized by those skilled in the art that the selection of the particular design module component will vary, depending upon the equipment which is selected for use with it. In this instance, a Hewlett Packard HP 2117F MOST is being used, and therefore the MC68000 is a standard interface module. Instructions given on the terminal 3 are relayed to the interface 20 over the design module 4 and TTL unit 5 which produces a digital output.

Figure 2:
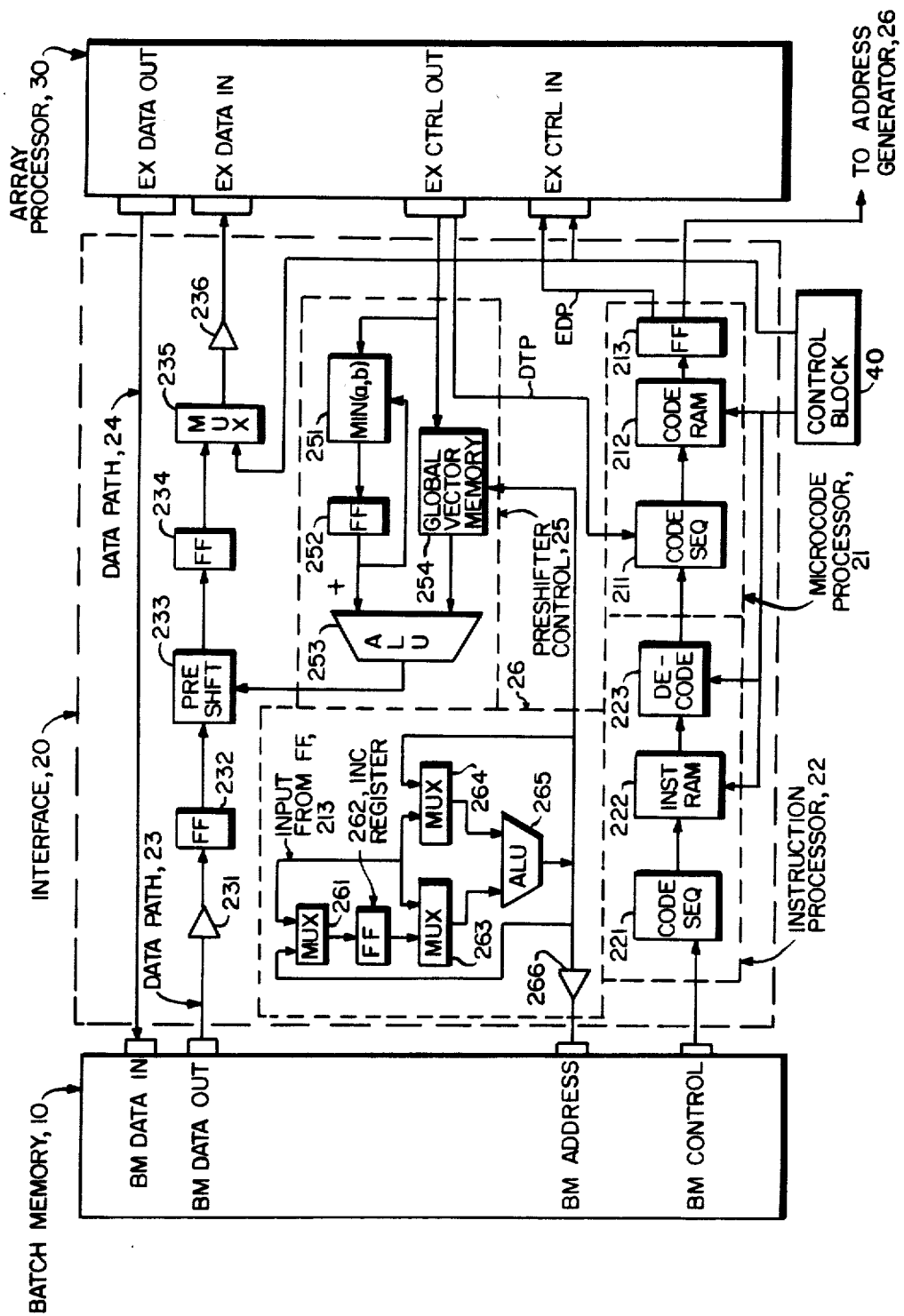
FIG. 2 is a detailed block diagram of the preferred embodiments of the invention

FIG. 2 is a detailed block diagram of the preferred embodiment of the present invention. The invention is a programmable interface 20 between an external batch memory 10 and an array processor 30 which solves the exponential normalization problem of Block Floating Point processors using: a microcode processor 21, an instruction processor 22, two data paths 23 and 24, a pre-shifter control 25 and an address generator 26.

FIG. 1 illustrated that radar signals are collected by the radar system's receiver and stored as data in the batch memory. The signals are then transferred in real-time over a data path in the interface to the array processor for processing. It is the instruction processor 22 shown in FIG. 2 which performs the sequence of fetch and store operations between the batch memory 10 and the array processor 30. The instruction processor 22, in the preferred embodiment shown in FIG. 2, consists of: a microcode sequence generator 221, an instruction random access memory (RAM) 222 and a decoder 223. The microcode sequence generator 221 receives control and address information from the control and address unit located in the batch memory 10. This control and address information is associated directly with the data that is being conducted over the first data path 23 of the interface 20 from the batch memory 10 to the array processor 30.

The control and address information is microcoded by the microcode sequence generator 221 into the instruction RAM 222. The instruction RAM 222 contains the user programs to perform the sequence of Fetch and Store operations between the batch memory 10 and the array processor 30. However, as shown in FIG. 2, the user can add new instructions, or change any of the existing instructions by a direct input into the instruction RAM 222 from his control system 40. Finally, the decoder 223 receives the output of the instruction RAM plus instructions from the control system 40 and picks out the data flow instructions during program execution, and passes them on to the microcode processor 21. The microcode processor 21 will then execute that particular instruction's timing sequence. All but two of the microcoded instructions are 4 to 8 clocks long and run nonstop from beginning to end. The two other micrododed instructions (FETCH and STORE) loop around a common section of microcode until a dimension counter is decremented to zero. In this way, the number of fetched or stored elements is programmable by the user.

The microcode processor 21 performs the function of actually creating all of the microcode waveforms for all of the microcoded instructions using; a microcode sequence generator 211, a microcode RAM 212, and a flip flop 213.

The microcode sequence generator 211 receives the control instructions from the instruction processor 22 and from the control board of the array processor 30. The information is microcoded and passed on to the microcode RAM 212. The microcode RAM 212 also receives any microcoded instructions from the user's control system 40, and passes the instruction information through the flip flop 213 to the control board in the array processor 30.

A handshake protocol exists between the instruction and microcode processors. The instruction processor 22 can perform program-flow instructions (Branching, DO-looping, Jump to Subroutine, etc.) on its own without the need of the microcode processor. On the other hand, once the microcode processor 21 begins execution of a data flow instruction, it cannot accept another instruction until it completes its current instruction. When the microcode processor 21 is executing an instruction, the instruction processor can step through and execute program-flow instructions (if any) until it stops on the next data flow instruction to be passed to the microcode processor. In this way, the microcode processor is kept busy as much as possible, and no runtime overhead exists to perform program-flow instructions.

Processor handshaking between instruction and microcode processors is accomplished with two signals, RLD and HALT. An RLD signal is used to notify the microcode processor that a new instruction is available and can be executed. HALT, on the other hand, is a signal from the microcode to instruction processor which notifies the completion of the current microcode instruction and allows passage of another instruction to the microcode processor 21.

The main function of the interface 20 is to control the transfer of data between the batch memory and the array processor. As such, two data paths 23 and 24 are provided. The first data path 23 passes 12 bit data from the two random access memories of the batch memory 10 to the memory board of the array processor 30. This first data path 23 contains: two amplifier 231 and 236, two flip flops 232 and 234, a pre-shifter 233 and a multiplexer 235.

The first amplifier 231 receives and amplifies the data from the batch memory 10, and sends it to the first flip flop 232. The output signal of the flip flop 232 is processed by pre-shifter 233. The pre-shifter 233 is strictly a downshifter and is used to normalize the batch memory-stored data swath when any portion of the swath is transferred to the array processor. It is this use of the pre-shifter that allows the use of a Block Floating Point processor as an array processor by compensation for the exponential normalization limitations of such processors.

The pre-shifter 233 receives a control signal from the pre-shifter control section 25, as discussed below, and produces an output signal. The output signal of the pre-shifter 233 is processed by the second flip flop 234, whose output is, in turn, multiplexed with instructions from the control system 40 by the multiplexer 235. The multiplexer's 235 output signal is amplified by amplifier 236 and sent to the array processor 30. The second data path 24 conducts the array processor data output to the batch memory 10. The pre-shifter control section 25 generates a 4-bit code used to command the pre-shifter 233 of the first data path 23. The pre-shifter control section 25 consists of a 1K×8 Global Scale Vector memory 254, a comparator/multiplexer 251, a flip flop 252, and an arithmetic logic unit (ALU) 253. The pre-shifter control section 25 accepts 12-bit data words from the batch memory 10, and applies an appropriate differential shift to normalize data before passing it on to the array processor 30. This normalization process is presented below in the discussion of the operation of the Global Scale Vector Memory.

The Global Scale Vector memory 254 receives a block of vector scales from the array processor 30, and an address signal from the address generator 26, and produces an output signal.

The Global Scale Vector Memory 254 stores a table of vector scales corresponding to each of the vectors stored in the batch memory 10. Flipflop 232 holds the current minimum swath vector scale, while the comparator 251 subtracts the current minimum vector scale from an incoming scale. If the new scale is less than the current minimum, the comparator output outputs the new incoming scale, and it becomes the new current minimum scale. Every new vector scale that enters the Interface board is presented to the comparator circuit 251 and written in to the Global Scale Vector Memory 254. These two operations occur during a STORE instruction.

One key function of the present invention is to provide a means of renormalizing the data in a batch memory 10. Consequently, after an algorithm is completed, the data stored back in the batch memory 10 exists as 12-bit mantissas only. A corresponding vector scale (effectively, the exponent of each vector slice in the batch memory, 10) is stored locally on the Interface board for each vector slice of the data swath.

The minimum vector scale over the data swath is selected as a reference scale for the swath. In this way, all other data residing in the batch memory 10 which has a larger scale than the minimum can be downshifted to effectively normalize the data swath. Renormalization of the batch swath occurs when data is re-fetched back to the processor 30 for further computations.

The comparator/multiplexer 251 receives a block of vector scales from the control board of the array processor 30, and feedback from flip flip 252. The flip flop 252 receives the output of the comparator/multiplexer 251 and acts as a latching network. Together, the Global Scale Vector memory 254, the comparator/multiplexer 251 and the flip flop 252 provide inputs into ALU 253.

The ALU 253 acts as a subtractor by subtracting the output of the Global Scale Vector memory 254 from the output of flip flop 252. In this manner the ALU subtractor 253 generates the swath normalization shift code which is fed to the pre-shifter 233 in the data path 23.

The address generator 26 is provided to compute a sequence of memory addresses for fetching and storing a sequence of vectors to and from the batch memory 10. The address generator consists of: a 16-bit ALU 265 which is used as an address register, three multiplexers 261, 263 and 264, and a flip flop 262 used as an increment register. The increment register 262 and the address register 265 (ALU output) are both set by the software instructions to the interface.

These software instructions are relayed to the address generator by the binary output signals of flip flop 213 which instructs the address generator to input, increment, or select a specific address for fetch and store operations for four different functions. The four functions of the address generator are: Add Address (ADDADR) in which a 16 bit number is added to the address register (or ALU); Add increment (ADDINC) in which a 16 bit number to the increment register 262; Set Increment (SETINC) which directs a setting of the increment register to a specific 16 bit number; and Set Address (SETADR) which sets the ALU 265 to a particular value. These four different functions may be triggered by the dual binary output signals of FF 213 as indicated below in Table 1:

TABLE 1

| FF 213 Output | Function of Address Generator |
|---|---|
| 0 0 | ADDADR |
| 0 1 | ADDINC |
| 1 0 | SETINC |
| 1 1 | SETADR |

The address generator computes a sequence of batch memory addresses for the fetching and storing of data between the batch memory 10 and the array processor 30. However, as indicated in FIG. 2, the actual data itself does not enter the address generator. The only information signals that enter the address generator are control and instruction signals so that the ALU 265 may generate the memory address that corresponds with the particular piece of data being stored or fetched.

The first multiplexer 261 of the address generator 26 receives a feedback signal from the output of the ALU 265 in the address generator 26 and multiplexes it with an instruction signal from the interface software from the flip flop 213 in the microcode processor 21. The output of the ALU is a 16 bit address signal of the latest address produced by the address generator. This is fed back into multiplexers 261 and 264, which forward these signals when receiving signals from flip flop 213. All multiplexers are identical units having a 1:1 ratio of input to output. The first multiplexor outputs a first combined signal by outputting the signal it receives from flip flop 213, followed by the signal it receives from flip flop 213, followed by the signal it receives from the ALU. As indicated in Table 1, the signal from the flip flop 213 indicates to the ALU which of four functions is being commanded. Once the ALU is alerted to the specific function it is to perform, it may receive either: the latest address used by the address generator (from MUX 264) which is prefaced by the SETADR command; or the new address from flip flop 213 may be incremented and routed from MUX 263.

The increment register 262 receives the first multiplexed signal from the first multiplexer 261 and produces an output signal which is sent to the second multiplexer 263.

The second multiplexer 263 is used to set the address register 265 by multiplexing the output of the increment register with an instruction signal from the interface software received from the flip flop 213. The second multiplexer 263 outputs a second combined signal consisting of the signals it receives from flip flop 213, followed by the 16 bit address signal it receives from increment register 262.

The third multiplexer 264 multiplexes a feedback signal from the output of ALU 265 in the address generator 26 with an instruction signal from the interface software from flip flop 213. The signals produced by flip flop 213 are presented in Table 1. The third multiplexer 264 outputs a third combined signal consisting of the signals it receives from flip flop 213, followed by the 16 bit address signal it receives from the ALU 265. The timing of all three multiplexers 261, 263, and 264 is handled automatically as they are triggered by flip flop 213. The command signals produced by flip flop 213 are presented in Table 1 and are conducted to the three multiplexers by a digital signal bus.

The output signals of the second and third multiplexers 263 and 264 are processed by the ALU 265 which acts as an address generator for message going to and from the batch memory 10. As described above, the ALU 265 generates, selects and increments 16 bit binary numbers which correspond with data being fetched and stored in the batch memory. When fetching is accomplished, signals from FF 213 direct the ALU to set the address (SETADR) to a specific 16 bit binary sequence. As data is stored, the address generator assigns 16 bit memory addresses which are sequentially incremented so that each separate data item has a separate address memory number assigned to it.

A bus transmitter 266 sends the amplified outputs fo the ALU 265 and Global Scale Vector memory 254 to the batch memory 10.

The configuration described above in the preferred embodiment provides a programmable interface which gives a Block Floating Point processor the capability of performing various real-time signal processing algorithms on data stored in an external batch memory.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. In combination with a data processing system having a batch memory which receives data signals, and a data processor receiving and processing a group of control and address signals and said data signals, and a control system for giving instruction signals to said data processing system, an interface between said batch memory and said data processor, said interface comprising:

an instruction processor means performing a sequence of fetch and store operations by receiving a first control and address signal from said batch memory and said instruction signals from said control system and outputting a second control and address signal;

a microcode processor means receiving said second control and address signal from said instruction processor means and said instruction signals from said control system and outputting a third control and address signal to said data processor, said third control and address signal controlling fetch and store operations of said data processor as modified by said control system;

a pre-shifter control means receiving a fourth control and address signal from said processor and generating a pre-shifter control signal which controls all exponential normalization of said data signals;

a first amplifier receiving and amplifying said data signals from said batch memory and producing an output signal;

a first flip flop producing an output signal by processing said output signal from said first amplifier;

a pre-shifter means receiving said output signal from said first flip flop and said pre-shifter control signal from said pre-shifter control means and producing an exponentially normalized data signal;

a second flip flop producing an output signal by processing said exponentially normalized data signal from said pre-shifter means;

a first multiplexer producing an output signal by multiplexing said output signal from said second flip flop with said instruction signals from said control system;

a bus transmitter producing an output signal for said data processor by amplifying said output signal from said first multiplexer;

a data path relaying processed data signals from said data processor to said batch memory; and an address generator means outputting address signals to said batch memory and said pre-shifter control means, said address signals containing a first memory address for said data signals fetched from said batch memory on said first data path, said address signals containing a second memory address for said processed data signals transferred from said data processor to said batch memory by said second data path.

2. An interface as defined in claim 1 wherein said instruction processor means comprises:
- a first microcode sequence generator producing an output signal by receiving and microcoding said first control and address signal from said batch memory;
- a first memory means receiving and storing said instruction signals from said control system and said output signal from said first microcode sequence generator and producing an output signal; and
- a decoder means outputting said second control and address signal by processing said output signal from said first memory means with said instruction signals received from said control system.

3. An interface as defined in claim 2 wherein said microcode processor means comprises:
- a second microcode sequence generator producing an output signal by receiving and microcoding said second control and address signal from said instruction processor means with a fifth control and address signal from said data processor;
- a second memory means receiving and storing said instruction signals from said control system and said output signal from said second microcode sequence generator and producing an output signal; and
- a third flip flop outputting said third control and address signal by processing said output signal from said second memory means.

4. An interface as defined in claim 3 wherein said pre-shifter control means comprises:
- a comparator means producing an output signal by receiving and comparing said fourth control and address signal from said data processor with a comparison signal produced in said pre-shifter control means;
- a fourth flip flop producing said comparison signal by processing said output signal from said comparator means;
- a third memory means receiving said fourth control and address signal from said data processor and said address signals from said address generator means and producing an output signal; and
- a subtractor means producing said pre-shifter control signal by subtracting said output signal received from said third memory means from said comparison signal received from said fourth flip flop.

5. An interface as defined in claim 4 wherein said address generator comprises:
- a second multiplexer producing an output signal by multiplexing said address signals produced by said address generator with said third control and address signal produced by said microcode processor means;
- a register means receiving said output signal from said second multiplexer and producing an incremented register signal;
- a third multiplexer producing an output signal by multiplexing said incremented register signal from said register means with said third control and address signal produced by said microcode processor means;
- a fourth multiplexer producing an output signal by multiplexing said address signals produced by said address generator with said third control and address signal produced by said microcode processor means;
- and a first arithmetic logic unit outputting said address signals by processing said output signal from said third multiplexer with said output signal from said fourth multiplexer.

6. An interface as defined in claim 5 wherein said address generator includes: a second amplifier producing and sending to said batch memory amplified address signals by receiving and amplifying said address signals from said first arithmetic logic unit.

7. An interface as defined in claim 6 wherein said register means of said address generator comprises: a fifth flip flop producing said incremented register signal by receiving and processing said output signal from said second multiplexer.

8. An interface as defined in claim 7 wherein said subtractor means in said pre-shifter control means is a second arithmetic logic unit which produces said pre-shifter control signal by subtracting said output signal received from said third memory means from said comparison signal received from said fourth flip flop.

* * * * *